Figure 1:
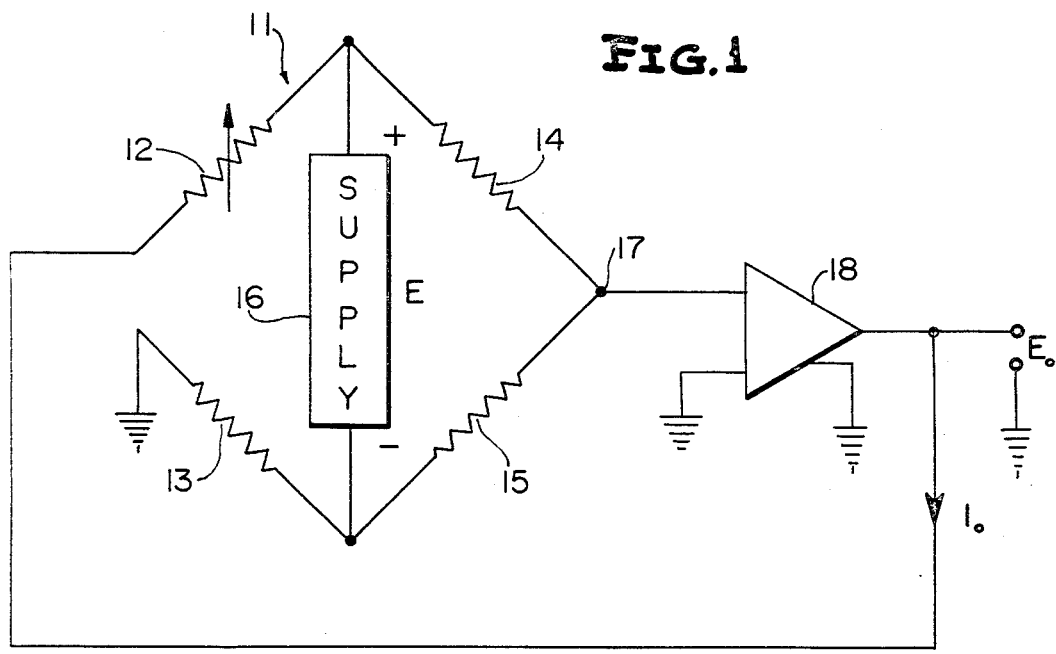

April 23, 1968   J. F. WALTON   3,379,973
IMPEDANCE MEASURING CIRCUIT HAVING THE
UNKNOWN IMPEDANCE IN THE FEEDBACK
PATH OF AN AMPLIFIER
Filed Jan. 10, 1966

INVENTOR
JOHN F. WALTON

BY *Hurvitz & Rose*

ATTORNEYS

United States Patent Office

3,379,973
Patented Apr. 23, 1968

3,379,973
IMPEDANCE MEASURING CIRCUIT HAVING THE UNKNOWN IMPEDANCE IN THE FEEDBACK PATH OF AN AMPLIFIER
John F. Walton, McLean, Va., assignor to Halliburton Company, Duncan, Okla., a corporation of Delaware
Continuation-in-part of application Ser. No. 255,044, Jan. 30, 1963. This application Jan. 10, 1966, Ser. No. 519,633
21 Claims. (Cl. 324—62)

The present application is a continuation-in-part of my invention Ser. No. 255,044, now abandoned, filed Jan. 30, 1963, for Impedance Measuring Circuit.

The present invention relates to impedance measuring systems and more particularly to an impedance measuring circuit employing a Wheatstone bridge wherein an error voltage indicative of bridge unbalance is supplied to the bridge to rebalance it.

Wheatstone bridges have been utilized for many years for measuring impedances and for telemetering purposes in combination with transducers to provide information indicative of a condition being monitored. Most prior Wheatstone bridge arrangements, however, are not ideally suited for either purpose because they generate a non-linear output voltage in response to linear variations in the bridge impedances. This is undesirable because compensation of the non-linearity must be provided to provide accurate data.

The present invention avoids this primary objection of the prior art yet retains the inherent accuracy of Wheatstone bridge measuring circuits. The object of the invention is accomplished by deriving an error voltage indicative of bridge unbalance and coupling this voltage back to the bridge in such a manner so as to rebalance the bridge. Bridge unbalance is sensed by a high input impedance, high-gain amplifier, preferably of the type referred to as an operational amplifier, having its output terminals connected in the arms of the bridge between a standard and variable impedance. The variable impedance is actually in the feedback path of the amplifier so that its variations linearly effect the amplifier output voltage.

When the bridge is in conventional balance, i.e. when the ratio of the variable to the standard impedances equals the ratio of the pair of fixed impedances, the input and output voltages of the bridge are zero. As the value of the variable impedance changes, an error signal is supplied to the input circuit of the amplifier. In response to the error signal, a voltage from the low impedance output of the amplifier is supplied between the variable and standard impedances to rebalance the bridge.

The output voltage of the amplifier is linearly related to changes in the variable impedance because the currents flowing through the variable and standard impedances from the amplifier are maintained equal and constant. The currents are equal since both of these impedances are in series with the amplifier output voltage. The current through the standard impedance, hence through the variable impedance, is constant because the amplifier always rebalances the bridge. When the bridge is rebalanced the voltage across the standard impedance is returned to its original value as is the voltage drop across the arm of the bridge constituted by the variable impedance in series with the output of the amplifier. Since the voltage drop across the variable impedance varies linearly with its changes and the sum of the voltages of the arm containing the variable impedance is constant, it follows that the output voltage of the amplifier is linearly related to changes in impedance of the variable element.

It is seen that under normal conditions, when the bridge is balanced (the conventional state of balance), the amplifier output voltage is zero and is maintained far from saturation. The variable impedance can undergo radical variations in both directions before the amplifier output signal reaches saturation. Thereby, the circuit provides an output linearly related with changes of the variable impedance over a wide range.

The present invention provides, at its output terminals, an exceptionally low impedance for efficiently driving sensitive or insensitive, low impedance meters without adversely affecting the inherent accuracy of the circuit. This is contrary to conventional bridge circuits, wherein a low impedance meter connected across the bridge arms constitutes a substantial load to adversely effect the sensitivity and accuracy of the measurements. For example, a typical 10 millivolt meter requires approximately 500 microamps for full scale deflection, a substantial load for a typical bridge having a 350 ohm output impedance. The output impedance of the present invention conceivably could be used with a 100 microvolt meter having a 50 milliampere full scale deflection. If a very sensitive meter having a resistance of 0.002 ohm were available, the present invention could be utilized to drive it.

A further feature of the invention, according to one embodiment, is that exactly the same linear response can be derived with measuring resistances having different quiescent values, and that the response is centered about zero for each quiescent value. In the field of temperature measurement, e.g. where metal, temperature responsive resistances are employed for sensors, this feature is highly desirable as it enables the derivation of a zero output voltage at any quiescent value. Like deviations from any of the quiescent values result in exactly the same output voltages from the amplifier, whereby the necessity for multiple calibration is avoided. The stated result is achieved by providing one arm of the bridge with a variable resistance and another arm, connected to the amplifier input, with a potentiometer. The slider and tap of the potentiometer and resistance, respectively, are ganged together. The resistance tap is adjusted so that impedance changes of the sensor are compensated and the amplifier output current is at the same level for differing quiescent temperatures. The potentiometer slider is adjusted whereby a null output is derived from the amplifier for quiescent conditions. Since current deriving from the amplifier is constant, for all quiescent conditions, its output voltage is always related to resistance changes of the sensor in the same manner.

It is, accordingly, an object of the present invention to provide a new and improved impedance measuring circuit wherein there is derived an output voltage linearly related to impedance variations.

Another object of the present invention is to provide a new and improved Wheatstone bridge circuit wherein a signal linearly related to changes in an impedance being measured is derived.

A further object of the present invention is to provide a Wheatstone bridge circuit having a feedback amplifier for deriving a signal linearly related to changes in a variable impedance, wherein the impedance is capable of wide variations without saturating the amplifier.

An additional object of the present invention is to provide a Wheatstone bridge for measuring variable impedances wherein an error voltage linearly related to changes of the impedance is coupled to the bridge to rebalance it.

A further object of the present invention is to provide a new and improved impedance measuring device of the Wheatstone bridge wherein highly sensitive, low impedance meters may be driven without affecting the inherent accuracy of the bridge.

Yet a further object of the invention is to provide a new and improved impedance measuring system wherein the same linear response, centered about the same voltage is derived for differing quiescent resistor points.

Still another object of the invention is to provide a temperature measuring circuit wherein a signal related to the same linear function of temperature is derived for different ambient conditions, and ambient is always sensed as a signal of reference level.

Figure 2:
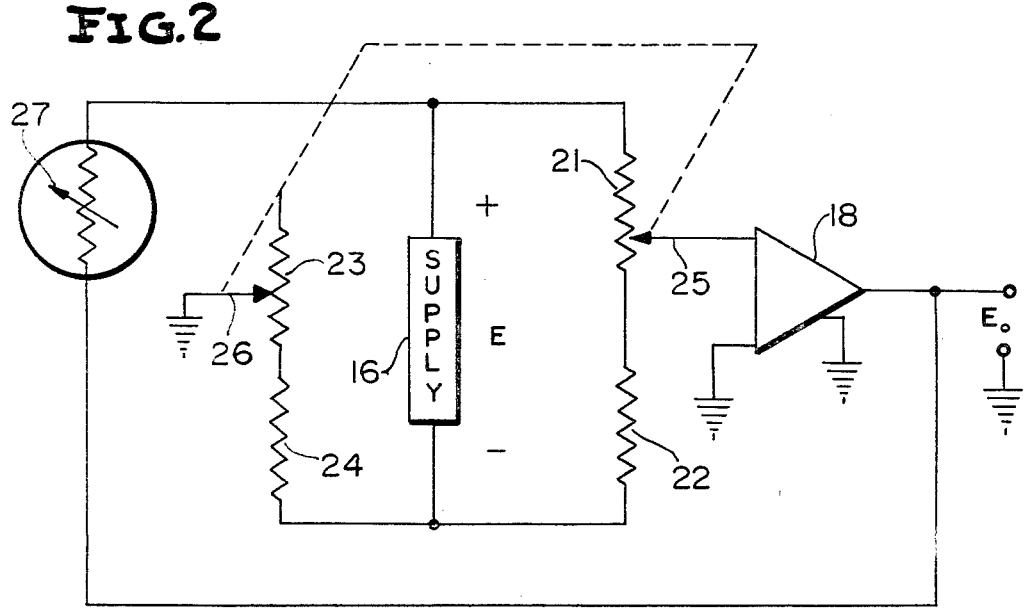

The above and still further objects, features and advantages of the present invention will become apparent upon consideration of the following detailed description of two specific embodiments thereof, especially when taken in conjunction with the accompanying drawings, wherein:

FIGURE 1 is a circuit diagram of a preferred embodiment of the present invention; and FIGURE 2 is a circuit diagram of a modified embodiment of the invention.

Reference is now made to the drawing, FIG. 1, wherein Wheatstone bridge 11, including variable resistor 12 and fixed resistors 13–15 is illustrtaed. Resistor 12 may be any variable type, but usually is of the condition responsive type such as employed in telemetering applications. One end of resistors 12 and 13 are connected to the positive and negative terminals of supply 16, respectively, the other end of resistor 13 being connected to a suitable reference potential which may be and is hereinafter referred to as ground. Resistors 14 and 15 are connected in series across supply 16, their junction being in effect a tap for the supply. Supply 16 functions in the same manner as a battery and is preferably an isolated D.C. power supply energized by a conventional A.C. power source, and having a low shunt capacity to ground. The supply may be of the type set forth in U.S. Patent No. 2,914,714 issued to John F. Walton and John H. Reaves.

The tap 17 between resistors 14 and 15 is connected to one input terminal of operational amplifier 18, the other input terminal of which is grounded. The output voltage of amplifier 18 is supplied to the bridge between one end of resistor 12 and the grounded end of resistor 13.

Operational amplifier 18 is of the well-known type having very high negative gain, high input and low output impedances, such as disclosed in "Electronic Analog Computers," written by Korn and Korn, published in 1952 by McGraw-Hill Book Company, Inc. The input impedance of amplifier 18 is such that it draws virtually no current from resistors 14 and 15. The output impedance of amplifier 18 is sufficiently low that resistors 12 and 13 substantially appear to be connected together if the amplifier develops zero output voltage.

If it is assumed that bridge 11 is balanced, i.e.

$$\frac{R_{12}}{R_{13}} = \frac{R_{14}}{R_{15}}$$

where $R_{12}$, $R_{13}$, $R_{14}$ and $R_{15}$ are the resistance values of resistors 12, 13, 14 and 15, respectively, the voltage difference between tap 17 and ground is zero. Hence the amplifier output voltage is zero. As the value of resistance 12 changes in either direction, the bridge becomes unbalanced and an error voltage is coupled between the input terminals of amplifier 18. This error voltage is greatly amplified, reversed in phase, and coupled back to bridge 11 between resistors 12 and 13 to rebalance the bridge. When bridge 11 is rebalanced, the voltages across its arms are such that the ratio $$\frac{V_{12} \text{ to ground}}{V_{13}} \text{ equals } \frac{V_{14}}{V_{15}}$$

where "$V_{12}$ to ground" is the voltage measured from the positive terminal of supply 16 to ground through resistor 12 and the output voltage of amplifier 18, and $V_{13}$, $V_{14}$ and $V_{15}$ are the voltages across resistors 13, 14 and 15, respectively.

That the output voltage of amplifier 18 is a linear function of changes in resistance 12 is seen from the following mathematical analysis: By Kirchoff's law, the voltage across the output terminals of amplifier 18 equals the voltages across resistors 12 and 13 and supply 16, i.e.

$$E_0 = -I_0 R_{12} + E - I_0 R_{13} \qquad (1)$$

where $E_0$ equals the output voltage of amplifier 18, E is the potential of source 16, and $I_0$ equals the output current supplied by amplifier 18 to bridge 11. The currents through resistors 12 and 13 are equal to each other and to $I_0$ because the input impedance of amplifier 18 is substantially infinite. Hence, the current flowing through resistor 12 in response to the output voltage of amplifier 18, divides between the parallel paths constituted by supply 16 and resistors 15 and 14, recombines and flows through resistor 13.

The voltage across the input terminals of amplifier 18, $E_1$, is equal to the sum of the output voltage from the amplifier 18 and the voltages across resistors 14 and 12.

$$E_1 = (E_0 + I_0 R_{12}) - \frac{E R_{14}}{R_{14} + R_{15}} \qquad (2)$$

But $$E_1 = \frac{E_0}{-A}$$

where A is the gain of amplifier 18. Also, $$I_0 = \frac{E - E_0}{R_{12} + R_{13}}$$

by solving Equation 1 for $I_0$. Substituting for $E_1$ and $I_0$ into Equation 2 gives $$\frac{-E_0}{A} = E_0 - \left(\frac{E_0 - E}{R_{12} + R_{13}}\right) R_{12} - \frac{E R_{14}}{R_{14} + R_{15}} \qquad (3)$$

Rearranging Equation 3 gives $$E_0 \left[ \left(1 + \frac{1}{A}\right) - \frac{R_{12}}{R_{12} + R_{13}} \right] = E \left[ \frac{R_{14} - R_{12}}{R_{14} + R_{15}} \frac{}{R_{12} + R_{13}} \right] \qquad (4)$$

Since $A \gg 1$, $$\left(1 + \frac{1}{A}\right) = 1 \qquad (5)$$

Substituting Equation 5 into Equation 4 and simplifying yields $$E_0 = \frac{E}{R_{13}} \left( \frac{R_{13} R_{14} - R_{12} R_{15}}{R_{14} + R_{15}} \right) \qquad (6)$$

While the foregoing analysis was made assuming positive output voltage and currents from amplifier 18, the same result is reached if the output voltage is negative.

Equation 6 is in the form of the equation for a straight line ($y = ax + b$) and reveals that the output voltage of amplifier 18 is a linear function of resistance 12; the $R_{12}$ constituting the X in the straight line equation above. The equation also shows that $E_0 = 0$ if the bridge is balanced, i.e. $R_{13} R_{14} = R_{12} R_{15}$. Since the amplifier output voltage is zero under quiescent operating conditions when the bridge is balanced, amplifier saturation is not easily reached even though large variations in resistance 12 occur.

That the output voltage of amplifier 18 is a linear function of resistance 12 may also be seen if it is appreciated that the currents it supplies to resistors 12 and 13 are maintained equal and constant as will be shown by the following physical analysis. Any change in potential across resistance 13 due to bridge unbalance produces an error signal at the input of amplifier 18. The output of amplifier 18 which is out of phase with the error signal coupled to it restores the bridge to balance. Hence, the potential across and current through fixed resistor 13 are returned substantially to their original value. Since the current through resistor 13 is maintained constant, the current through resistor 12, in series with resistance 13 through supply 16, is kept constant despite changes in the value of resistor 12. In consequence, the voltage drop across resistor 12 varies linearly as a function of its value.

Because the voltage across resistance 13 remains constant, the sum of the voltages between ground and the positive terminal of supply 18 through the amplifier output and resistance 12 is fixed. Accordingly, the output voltage of amplifier 18, $E_0$, varies to satisfy the relation $E_0 + V_{12} = KI_0$, where K is a constant and $V_{12}$ is the voltage across resistor 12. Since $V_{12} = R_{12}I_0$ and $I_0$ is constant, the output voltage of amplifier 18 is linearly related to $R_{12}$.

It is to be realized that both the input and output of amplifier 18 have a grounded referenced output in the conventional manner. This approach is superior to prior art feedback circuits wherein only the amplifier input or output, but not both, are referenced to ground. Hence, the prior approach to the problem is not frequently feasible because it requires a special amplifier having floating input or output.

The present invention can be modified to derive an output voltage that varies linearly by the same amount about zero regardless of the quiescent value for resistor 12. For temperature monitoring applications, in particular, where resistor 12 constitutes a metal temperature responsive impedance having a positive linear temperature coefficient, that may be subjected to different ambient conditions, this feature is sought. It enables the derivation of a zero voltage at different ambient temperatures and identical incremental voltages for identical temperature changes from the different ambients. FIGURE 2 is a schematic diagram of the apparatus for attaining this result.

FIGURE 2 differs from FIGURE 1 in that resistors 14 and 15 of the latter are replaced by the series combination of potentiometer 21 and resistor 22 while the series circuit of potentiometer 23 and resistor 24 is substituted for resistor 13. Sliders 25 and 26 of linear slide wire resistances of potentiometers 21 and 23, respectively, are ganged together so they both turn in the same direction, i.e., both sliders are simultaneously connected to resistors 22 and 24 and move away from these resistors in unison.

Potentiometers 21 and 23 are provided to establish null voltages for different quiescent conditions. The resistors 22 and 24, are included mainly for certain practical reasons and theoretically they might be omitted. For example, the tracking of the two potentiometer slides may not be perfect, i.e., as each slide approaches the lower termination of each resistance wire, the relative values of the small remaining resistance lengths may not remain exactly proportional. Thus, the addition of resistances 22 and 24 obviates this effect since the change in resistance is now a much smaller proportion of the total resistance. Further, resistors 22 and 24 function to maintain a minimum current metering resistance for $R_{13}$ or the equivalent summation resistances of FIGURE 2. Resistors 22 and 24 preclude the possibility of zero input voltage to amplifier 18 when sliders 24 and 25 are rotated to the bottoms of potentiometers 21 and 23 and a null does not actually exist in the bridge.

The following analysis demonstrates how the bridge circuit of FIGURE 2 is capable of being balanced with the output voltage of amplifier 18 nulled (0 volt) for any ambient value of resistance 27. The analysis further demonstrates the linearity of the change in the output voltage of amplifier 18 with respect to resistance changes of resistor 27 from *any* ambient value.

By definition, let:

$R_{21}$ = total resistance of potentiometer 21
$R_{22}$ = total resistance of resistor 22
$R_{23}$ = total resistance of potentiometer 23
$R_{24}$ = total resistance of resistor 24
$xR_{21}$ = resistance of potentiometer 21 from its bottom to slider 25
$(1-x)R_{21}$ = resistance of potentiometer 21 from its top to slider 25
$xR_{23}$ = resistance of potentiometer 23 from its bottom to slider 26
$(1-x)R_{23}$ = resistance of potentiometer 23 from its top to slider 26.

In any embodiment of the bridge circuit in FIGURE 2, there will be some relationship between resistor 22 and potentiometer 21 which may be represented as:

$$R_{21} = K_1 R_{22}$$

where $K_1$ is a constant determined by the particular values chosen for $R_{21}$ and $R_{22}$. Similarly, it may be said that:

$$R_{23} = K_2 R_{24}$$

where $K_2$ is determined by the particular values chosen for $R_{23}$ and $R_{24}$. For the purposes of substituting the parameters of FIGURE 2 into Equation 6 supra, the following substitutions must be made:

$$R_{12} = R_{27}$$
$$R_{13} = R_{24} + xR_{23} = R_{24}(1 + K_2 x)$$
$$R_{14} = (1-x)R_{21} = K_1 R_{22}(1-x)$$
$$R_{15} = R_{22} + xR_{21} = R_{22}(1 + K_1 x)$$

Substituting these values into Equation 6 we find:

$$E_0 = \frac{E}{R_{24}(1+K_2 x)} \cdot \frac{[R_{24}(1+K_2 x)K_1 R_{22}(1-x)] - [R_{27}R_{22}(1+K_1 x)]}{K_1 R_{22}(1-x) + R_{22}(1+K_1 x)} \quad (7)$$

For illustrative purposes, let us assume the case where $R_{21} = R_{22}$, and $R_{23} = R_{24}$. Under such conditions it is seen that $K_1 = 1$ and $K_2 = 1$. Substituting these values for $K_1$ and $K_2$ into Equation 7 results in the following:

$$E_0 = \frac{E}{R_{24}} \cdot \frac{R_{24}(1-x) - R_{27}}{2} \quad (8)$$

By inspecting Equation 8, it becomes apparent that a null output voltage ($E_0 = 0$) is derived if $R_{27} = R_{24}(1-x)$, which can be achieved by varying $x$, through adjustment of ganged sliders 25 and 26 on potentiometers 21 and 23. It is also noted from Equation 8 that once a null has been set by varying X, that $E_0$ depends solely on $R_{27}$, no matter what the quiescent value of $R_{27}$ is that establishes the null value for $E_0$. Equation 8 shows that the settings of potentiometer sliders 25 and 26 do not effect $E_0$ once the null has been reached because the only factor of $R_{27}$ is $1/R_{24}$. Since $R_{24}$, the resistance of resistor 24, always remains constant, $E_0$ is linearly related to $R_{27}$ in the same manner regardless of the quiescent value for $R_{27}$.

Thus, it follows from Equation 8, that once a setting for $x$ has been established (on the basis of the ambient value of $R_{27}$), $E_0$ depends solely on $R_{27}$ since $R_{27}$ is the only variable of the equation. It is to be noted that Equation 8 is an equation for a straight line of the form $y = ax + b$, where $y = E_0$, the dependent variable; $x = R_{27}$, the independent variable;

$$a = -\frac{E}{2R_{24}}$$

the slope of the line; and $$b = \frac{ER_{24}(1-x)}{2R_{24}}$$

the value of the $y$-intercept. Consequently, $E_0$ will follow changes in $R_{27}$ in a linear manner. If resistor 27 is constructed such that its resistance varies linearly with temperature as is contemplated by the embodiment of FIGURE 2, $E_0$ is a direct indication of temperature changes about some predetermined ambient temperature.

For simplicity of calculation, the above analysis has been made for the illustrative case where $K_1 = K_2 = 1$ ($R_{21}=R_{22}$ and $R_{23}=R_{24}$), it can be shown that other values for $K_1$ and $K_2$ will yield the same general results, namely;

(1) There is a setting for potentiometers 21 and 23 for all practical values of resistor 27 which will balance the bridge and null the amplifier;

(2) Once the potentiometers have been set, $E_0$ varies linearly with $R_{27}$. It is therefore seen that the output voltages of amplifier 18 are linearly related to resistance changes of sensing element 27 in the same manner no matter what ambient temperature is and that a null can be derived for each ambient by rotating sliders 25 and 26 together.

The stated result is attainable only with the ganged potentiometer apparatus illustrated. If only one of potentiometers 21 or 23 is employed, the system can be nulled and derive a linear output voltage for different ambient conditions. The proportionality constant, however, between temperature change and output voltage is not the same for the different ambient conditions as substitution into Equation 8 reveals. Similarly, said proportionality constant will change if the relationship between the resistance of elements 21, 22, 23 and 24 are changed ($K_1$ and $K_2$).

Physically it can be seen that the same result is attained when it is realized that increases in the resistance of sensor 27 are accompanied by decreases of resistance in the branch including elements 23 and 24 between the negative terminal of supply 16 and grounded tap 26. The increases and decreases exactly balance each other so that the output current of amplifier 18 remains constant. Since the current through sensor 27 remains constant as its impedance is increased, the voltage amplitude at the plus terminal of supply 16 and top of potentiometer 21 increases. To obtain a voltage null for quiescent conditions to the input of amplifier 18, potentiometer slider 25 is rotated downwardly by the same amount as tap 26 until $E_0=0$. Since the output current of amplifier 18, as described supra, is maintained constant, its output voltage always is directly proportional to changes in the resistance of sensor 27, regardless of the sensor quiescent temperature. Since temperature and resistance of sensor 27 are linearly related and the amplifier output current is always constant, it is seen that the voltage across sensor 27 is always directly proportional, by the same linear factor, to the deviation of the sensor resistance from ambient. The voltage across resistance 27 is reflected to the input of amplifier 18 so that its output voltage varies in the desired manner.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. An impedance measuring circuit comprising an impedance bridge having an impedance to be measured connected in one arm of said bridge, and means for maintaining a constant current in said one arm of said bridge so as to maintain said bridge in a balanced condition despite variations in said impedance to be measured, said means for maintaining including means for deriving an error voltage indicative of the degree of bridge imbalance, and means for applying said error voltage in series with said impedance to be measured.

2. The combination according to claim 1 wherein said bridge includes a source of voltage, an impedance having a tap, said tapped impedance connected across said source, a further impedance connected between one end of said source and a reference terminal, and said impedance being measured having one of its terminals connected to the other end of said source; said means for deriving an error voltage being connected to respond to the voltage between said tap and said reference terminal, and said means feeding said error voltage being connected in series between the other terminal of said impedance being measured and said reference terminal the currents through said further impedance being measured are maintained equal and constant despite variations in the impedance being measured.

3. The system of claim 2 wherein said means for maintaining comprises an operational amplifier.

4. The combination according to claim 2 wherein said means for deriving said error voltage includes an amplifier having input and output circuits both referenced to said reference terminal and said means for feeding said error voltage comprises a negative feedback path including said impedance to be measured.

5. The system of claim 2 wherein said means for deriving comprises a high gain amplifier with high input impedance, and wherein the impedance being measured is connected in a feedback path between the input and output terminals of said amplifier.

6. The combination according to claim 2 further comprising adjustable means for initially balancing said bridge and nulling said error voltage for any impedance value of said impedance to be measured.

7. The combination according to claim 6, wherein said adjustable means comprises means for concurrently varying the values of said further impedance and said tapped impedance.

8. An impedance measuring system comprising a Wheatstone bridge, said bridge including; a soure of voltage, an impedance having a tap, said tapped impedance connected across said source, a further impedance connected between one end of said source and a reference potential terminal, an additional impedance which is being measured having one of its terminals connected to the other end of said source means for maintaining a constant current through said additional impedance, said means for maintaining comprising; means for deriving an error voltage in response to the voltage between said tap and said reference potential terminal, and means coupling said error voltage between the other terminal of said additional impedance being measured and said reference potential terminal for balancing said bridge.

9. A system for measuring the value of an impedance comprising a power source having first and second terminals, said impedance being measured having one of its ends connected to said first terminal, another impedance having one of its ends connected to said second terminal, means deriving a first voltage intermediate the voltages on said first and second terminals, means responsive to the voltage difference between the voltage on the other end of said another impedance and said first voltage for deriving an error voltage, and means responsive to said error voltage for maintaining the currents through said impedances equal and constant despite variations in the impedance being measured.

10. The system of claim 9 wherein said means for deriving an error voltage is an operational amplifier having a high input impedance and a low output impedance.

11. An impedance measuring system comprising a first impedance whose value is to be determined, a power supply having a pair of terminals, means deriving a first voltage intermediate the voltage across said terminals, means connecting one end of said first impedance to one of said terminals, means connecting a second impedance between another of said terminals and a reference potential terminal, an amplifier having an output circuit, means connecting said amplifier to derive an error voltage across said output circuit which is proportional to the difference between said first voltage and the reference potential and means connecting only said output circuit between said reference potential terminal and the other end of said first impedance in such a sense as to reduce said error voltage.

12. An impedance measuring circuit, comprising two parallel circuits, a power supply connected across both said parallel circuits, one of said parallel circuits including impedance means, a high gain amplifier having a high impedance input circuit and a low impedance output circuit, a reference potential terminal, means connecting said input circuit between said reference potential terminal and a point on said impedance means having a voltage intermediate the voltage of said power source, the other of said parallel circuits having connected in series only a variable impedance, said output circuit of said amplifier and a further impedance means, the connection between said output circuit and said further impedance means being connected to said reference potential terminal.

13. An impedance measuring system comprising:
a source of voltage;
circuit means connected in parallel with said source, said circuit means comprising two circuit branches connected in series with one another;
an impedance to be measured connected as part of at least one of said branches;
a constant reference potential point connected to a point between said branches;
means for deriving a voltage in response to changes in said impedance;
control means responsive to said means for deriving and connected to said reference potential point and in said one of said branches for maintaining the ratio of the voltage drop across said branches constant.

14. The system of claim 13 further comprising:
a second circuit means connected in parallel with said source, said second circuit means comprising two circuit branches connected in series with one another;
means connecting said control means to a point between said branches of said second circuit means.

15. The system of claim 14, wherein:
said two branches of said second circuit means and the other branch of said first circuit means comprise concurrently adjustable impedance means for equalizing the impedance ratios between the branches of said first circuit means and the branches of said second circuit means.

16. An impedance measuring system comprising:
a source of voltage;
an operational amplifier having an input circuit and an output circuit;
a first circuit in parallel with said source comprising a first potentiometer having a slider arm and a resistor in series;
a second circuit in parallel with said source comprising a condition responsive resistance element, the output circuit of said operational amplifier, a second potentiometer, and a resistor in series;
a point of reference potential connected between said second potentiometer and said output circuit of said operational amplifier;
means connecting the slider arm of said first potentiometer and said reference potential to the input circuit of said operational amplifier;
means for ganging the sliders of said first and second potentiometers.

17. An impedance measuring system comprising a bridge circuit having the impedance being measured connected in one of its arms, means for deriving an error voltage indicative of bridge imbalance, and means feeding said error voltage in series with said impedance being measured for balancing said bridge; wherein said bridge includes a source of voltage, a second impedance connected across said source, a further impedance connected between one end of said source and a reference terminal, said impedance being measured having one of its terminals connected to the other end of said source; said means for deriving an error voltage being connected to respond to a voltage between said reference terminal and a point along said second impedance, said means feeding said error voltage being connected between the other terminal of said impedance being measured and said reference terminal; adjustable means for initially balancing said bridge and nulling said error voltage for any impedance value of said impedance to be measured, said adjustable means comprising means for concurrently varying the values of said further impedance and said second impedance including ganged variable resistors having mechanical means for varying their results, at least one of said variable resistors comprising part of both said further impedance and said second impedance, and wherein the position of the mechanical means required to produce bridge balance and error voltage null varies in accordance with the value of said impedance being measured.

18. An amplifier network comprising:
an amplifier having an input circuit and an output circuit, each of said circuits having a variable voltage terminal and a reference terminal connected to a reference potential;
a series circuit having a variable impedance, a source of potential, and a further impedance connected in series with one another in the order recited, said series circuit connected across said output circuit with said variable impedance having one end connected to said variable voltage terminal of said output circuit and said further impedance being directly connected to said reference terminal of said output circuit;
means for deriving a voltage from said series circuit and applying said voltage across said input circuit in such a sense as to maintain the current through said series circuit constant.

19. The combination according to claim 18 further comprising adjustment means for selectively varying said voltage to permit nulling of said voltage for any value of impedance of said variable impedance.

20. The combination according to claim 18 wherein said means for deriving comprises a sensing circuit having impedance means connected in parallel with said source of potential, and means for connecting a circuit point of said impedance means to said variable voltage terminal of said input circuit.

21. The combination according to claim 20 wherein said further impedance comprises a potentiometer having a first slider arm, said further impedance being directly connected to said reference potential only through said first slider arm, and wherein said impedance means in said sensing circuit comprises a potentiometer having a second slider arm comprising said circuit point in said sensing circuit, means for ganging said first and second slider arms to vary their associated impedances in corresponding positions to permit nulling of said voltage for any impedance value of said variable impedance.

References Cited

UNITED STATES PATENTS

| | | | |
|---|---|---|---|
| 3,213,360 | 10/1965 | Cook et al. | 324—61 |
| 2,495,752 | 1/1950 | Montgomery | 324—57 |
| 3,019,970 | 2/1962 | MacNeil | 235—61 |
| 3,148,339 | 9/1964 | Bell et al. | 330—69 |

FOREIGN PATENTS

| | | |
|---|---|---|
| 738,626 | 7/1943 | Germany. |
| 886,287 | 1/1962 | Great Britain. |

RUDOLPH V. ROLINEC, *Primary Examiner.*

WALTER L. CARLSON, *Examiner.*

E. E. KUBASIEWICZ, *Assistant Examiner.*